United States Patent
Yano

(10) Patent No.: US 9,491,329 B2
(45) Date of Patent: Nov. 8, 2016

(54) IMAGE FORMING APPARATUS

(71) Applicant: CANON KABUSHIKI KAISHA, Tokyo (JP)

(72) Inventor: Yuzuru Yano, Moriya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/674,968

(22) Filed: Mar. 31, 2015

(65) Prior Publication Data
US 2015/0288852 A1    Oct. 8, 2015

(30) Foreign Application Priority Data

Apr. 4, 2014   (JP) .................................. 2014-077522

(51) Int. Cl.
| | | |
|---|---|---|
| *G06K 15/02* | (2006.01) | |
| *H04N 1/393* | (2006.01) | |
| *H04N 1/00* | (2006.01) | |
| *H04N 1/32* | (2006.01) | |

(52) U.S. Cl.
CPC ............ *H04N 1/393* (2013.01); *H04N 1/0097* (2013.01); *H04N 1/32358* (2013.01)

(58) Field of Classification Search
None
See application file for complete search history.

(56) References Cited

U.S. PATENT DOCUMENTS

| | | | | |
|---|---|---|---|---|
| 8,175,323 B2* | 5/2012 | Yamaguchi | ........... | G06T 1/0028 382/100 |
| 2001/0043759 A1* | 11/2001 | Eguchi | .................. | G06T 3/4023 382/299 |
| 2002/0001416 A1* | 1/2002 | Zhou | ......................... | H04N 5/21 382/268 |
| 2004/0196357 A1* | 10/2004 | Tasaka | .................. | B41C 1/1083 347/248 |
| 2008/0089585 A1* | 4/2008 | Yashima | ................. | H04N 1/393 382/173 |
| 2011/0286011 A1* | 11/2011 | Shoji | ..................... | H04N 1/3935 358/1.1 |
| 2012/0147403 A1* | 6/2012 | Nakamura | .......... | G06K 15/1219 358/1.13 |
| 2013/0070308 A1* | 3/2013 | Kurigata | ................. | H04N 1/393 358/451 |
| 2015/0181076 A1* | 6/2015 | Mita | ....................... | H04N 1/401 358/1.2 |
| 2015/0278659 A1* | 10/2015 | Yano | .................. | G06K 15/1843 358/1.9 |

* cited by examiner

*Primary Examiner* — Ted Barnes
(74) *Attorney, Agent, or Firm* — Fitzpatrick, Cella, Harper & Scinto

(57) ABSTRACT

An image forming apparatus includes an image forming unit for forming an image on a recording medium, a fixing unit for fixing the image on the recording medium, a storage unit configured to store image data representing the image, a first generation unit for generating a first position information which represents a position of a target pixel in a first direction which corresponds to a conveyance direction of the recording medium. The apparatus further includes a second generation unit for generating a second position information which represents a position of the target pixel in a second direction which is perpendicular to the first direction; a setting unit for setting, based on magnification changing information in the first direction which corresponds to a conveyance direction of the recording medium, a division condition for dividing the image data representing the image into two or more areas in the first direction.

9 Claims, 14 Drawing Sheets

BEFORE ENLARGEMENT

AFTER ENLARGEMENT

IMAGE FORMING APPARATUS

BACKGROUND OF THE INVENTION

Field of the Invention

The present disclosure relates to an image forming apparatus for performing image processing in which a magnification of an image represented by image data is changed.

Description of the Related Art

In an image processing apparatus which processes an image with an electrostatic latent image, there is a problem that the image size formed on the transfer member will differ from the image size originally intended. This is due to the fact that the size of the image is influenced by the variation in the attachment position and/or heat generated at the time of fixing the formed image.

For such a problem, US2008/0089585 (A1) discloses an image reading apparatus which measures an enlargement ratio or a reduction ratio (magnification ratio) in an image forming process, based on an image size of the output image and a size of an originally intended image. And the magnification of the original image data is changed by performing inverse magnification correction, which cancels the measured magnification ratio, on the original image data. The result of the inverse magnification correction is used as an input data. Thus, a size of a finally output image is corrected to be the originally intended size.

For example, description is made for a case where an image formation is performed and an image size of an output image is 99[%] of that of an input image in a main scanning direction, and an image size of an output image is 101[%] of that of an input image in a sub-scanning direction. In this case, an originally intended image size is obtained by multiplying the original image size by the reciprocal of the measured magnification and performing an image forming process thereafter. Specifically, the image size of the input image is multiplied by 1.010101 . . . (reciprocal of 99[%]=100/99)[%] in a main scanning direction, and the image size of the input image is multiplied by 0.990099 (reciprocal of 101[%]=100/101)[%] in the sub-scanning direction. As a result, the image size of the output image becomes 1.010101 . . . *99[%]=100[%] in a main scanning direction, and becomes 0.9099 . . . *101[%]=100[%] in a sub-scanning direction.

When performing a magnification changing of the input image data, in an image reading apparatus described in US2008/0089585 (A1), the number of pixels, which is treated as a difference between a size of an input image and that of an image size to which a magnification ratio is multiplied, in a main scanning direction is calculated. Further, an input image is divided into two or more areas. The number of the divided areas is determined to be the number of pixels treated as the difference in a main scanning direction. For example, as illustrated in FIG. 16, when a difference between an input image size and an output image size is 10 pixels in a main scanning direction, the input image will be divided into 10 areas by lines (dotted line of FIG. 16) perpendicular to the main scanning direction. Then, for each divided area, a random position is determined for specifying a pixel such that one random position is determined in one line in the main scanning direction. It is noted that, even in the same area, the random positions may differ depending on the sub-scanning position. Thus, when a magnification ratio is an enlarging ratio, a pixel is added to the determined random position, and when a magnification ratio is a reduction ratio, a pixel is deleted to the determined random position.

FIG. 17 is a schematic diagram visually illustrating a pixel specified at a determined random position. In FIG. 17, a part of a divided area is enlarged. Area boundaries illustrated in FIG. 17 correspond to the dotted line portion illustrated in FIG. 16, respectively. The above-mentioned magnification ratio multiplication flow in a main scanning direction similarly applies to that in a sub-scanning direction.

In an image processing device which outputs and inputs image data per a constant sub-scanning line and performs image processing, when changing a magnification in a sub-scanning direction according to the above-mentioned magnification ratio multiplication flow, it is necessary to store a random number value in a memory for determining a random position. This is due to the fact that a random number value is a position information over two or more lines, and it is necessary to maintain the random number value until a scan within a range, in which the random number value is applied, is completed.

Here, description is given in a case where an enlargement processing is performed to an image in a sub-scanning direction by an image processing device which processes image data by one line. For convenience, the number of pixels in the sub-scanning direction of the divided area is 10 pixels. FIG. 18 is a diagram illustrating a situation in which a random position is determined in one divided area when performing a magnification changing of the image in a sub-scanning direction. The coordinate value representing a main scanning position is "X". The coordinate value representing a sub-scanning position is "y". The image processing is performed by one line. Thus, first, data, where coordinate value y=1 is output: {(x,y)=(1,1) (x,y)=(2,1) (x,y)=(3,1) (x,y)=(4,1) . . . }. Then, data, where coordinate value y=2 is output. Further, data, where coordinate value, y=3, y=4, . . . , y=11 is sequentially output.

Note that, in the enlargement processing illustrated in FIG. 18, one pixel is enlarged in the sub-scanning direction in the area, which is known in advance. Thus, if the number of the pixels in the sub-scanning direction of the area of the input image is 10 pixels, the number of the pixels in the sub-scanning direction of the output image will be 11 pixels, obtained by 10+1. It is necessary to generate the random number to determine the random position when exceeding the area boundaries, that is, when the image formed when coordinate value y=1 is output. This is due to the fact that, in case the random number is calculated when the coordinate value y=2, when a value for causing image processing at the coordinate value y=1, the image at the coordinate value y=1 has been output. Therefore, it is impossible to perform image processing at the coordinate value y=1. In the following, this is explained with a particular example.

A random number value rnd(x) is the random number value corresponding to a pixel position (number of pixels) in the sub-scanning direction of the area. In the following example, operation is described in a case where the random number value rnd(x) takes the following values.

(1) coordinate value x=1, rnd (1)=2
(2) coordinate value x=2, rnd (2)=4
(3) coordinate value x=3, rnd (3)=5
(4) coordinate value x=4, rnd (4)=7
(5) coordinate value x=5, rnd (5)=10
(6) coordinate value x=6, rnd (6)=3
(7) coordinate value x=7, rnd (7)=9
(8) coordinate value x=8, rnd (8)=6
(9) coordinate value x=9, rnd (9)=10
(10) coordinate value x=10, rnd (10)=2
(11) coordinate value x=11, rnd (11)=8
(12) coordinate value x=12, rnd (12)=4
(10) coordinate value x=13, rnd (13)=1

When outputting an image where the coordinate values (x,y)=(1,1), the random number value rnd (1) is referred. Since the random number value rnd (1)=2, the determined random position is where the coordinate value y=2. Therefore, no processing is performed where the coordinate value y=1. The same applies to the followings: (x,y)=(2,1),(x,y)=(3,1), . . . , (x,y)=(12,1). When processing the image where the coordinate values (x,y)=(13,1), the random number value (13)=1. The value of the random number value rnd (13) matches with a line value currently being processed, so that the enlargement processing needs to be performed. To perform the enlargement processing, an image which is one line advanced, that is, an image where the coordinate values (x,y)=(13,0), need to be output. In the following, the image where the coordinate value x=13 is shifted by one line in the sub-scanning direction. Next, the random number value rnd (2) is referred. This is the random number value to process the image where the coordinate values (x,y)=(1,2). Then, to output the image where the coordinate values (x,y)=(2,2), the value of the random rnd (2) is referred. Thereafter, the processing is repeated until the image where the coordinate values (x,y)=(13,11) is output.

Applying the enlargement processing in this manner, an output image shown in FIG. 19B is obtained from an input image shown in FIG. 19A. Although the number of pixels in the sub-scanning direction of the area is 10 pixels in the input image, after the enlargement processing, the number of pixels in the sub-scanning direction is changed to 10 pixels. It means that the image is enlarged by 10[%] in the sub-scanning direction, which is obtained by (11/10)*100-100=10[%]. Note that, the area boundaries are shifted by one line in accordance with the enlargement processing. In the enlargement processing flow described as above, during the period in which the data corresponding to the coordinate value y=1 to the data corresponding to the coordinate value y=11 are output, the random number value calculated where the coordinate value y=1 is always referred. Thus, the random number value obtained where the coordinate value y=1 needs to be stored in a memory.

The flow as above is to explain the enlargement processing. When performing a reduction processing, instead of adding, the pixel is deleted. Then, the image data is shifted in a direction such that the size of the image is reduced. Note that, similar to the enlargement processing, it is necessary to store the random number value in the memory in the reduction processing. Further, for convenience, description was given in a case where the number of pixels in the main scanning direction is 13 pixels.

However, in the actual image processing apparatus, sometimes, the number of pixels in the main scanning direction is 8000 pixels or more. Therefore, large capacity memory is required to store the random number value. Thereby, a manufacturing cost of the image processing apparatus increases, which is a problem.

It is a main object of the present disclosure to provide an image processing apparatus which can omit a memory for storing a random number value used for image processing.

SUMMARY OF THE INVENTION

An image forming apparatus of the present disclosure includes: an image forming unit configured to form an image on a recording medium; a fixing unit configured to fix the image on the recording medium; a storage unit configured to store image data representing the image; a first generation unit configured to generate a first position information which represents a position of a target pixel in a first direction which corresponds to a conveyance direction of the recording medium; a second generation unit configured to generate a second position information which represents a position of the target pixel in a second direction which is perpendicular to the first direction; and a setting unit configured to set, based on magnification changing information in the first direction which corresponds to a conveyance direction of the recording medium, a division condition for dividing the image data representing the image into two or more areas in the first direction. The setting unit comprising: a pseudo-random number value generation circuit configured to generate a random number value based on a seed value; a holding unit configured to hold a seed value; and a seed value setting unit, and a control unit. The control unit is configured to: store a seed value which is set in the pseudorandom number value generation circuit in the holding unit when a second position of the target pixel is different from the second position of the previous pixel and the area of the target pixel is different from that of the previous pixel; and perform a magnification changing to the image when a second position of the target pixel is different from the second position of the previous pixel and the area of the target pixel is different from that of the previous pixel, the magnification changing is performed based on the generated random number value which is generated by setting the seed value held in the holding unit in the pseudorandom number value generation circuit, and by controlling reading of the image data stored in the storing unit. The control unit is further configured to cause the pseudorandom number value generation circuit for each target pixel to generate a random number value. In addition, based on the generated random number value, the second position information and the first position information, the control unit is further configured to read the image data corresponding to the target pixel from the storing unit.

Further features of the present invention will become apparent from the following description of exemplary embodiments (with reference to the attached drawings).

BRIEF DESCRIPTION OF THE DRAWINGS

FIG. 11 is a timing chart of the magnification changing processing in the sub-scanning direction.

FIG. 13 is a timing chart of the magnification changing processing in the sub-scanning direction following that in FIG. 12.

DESCRIPTION OF THE EMBODIMENTS

First Embodiment

Figure 1:
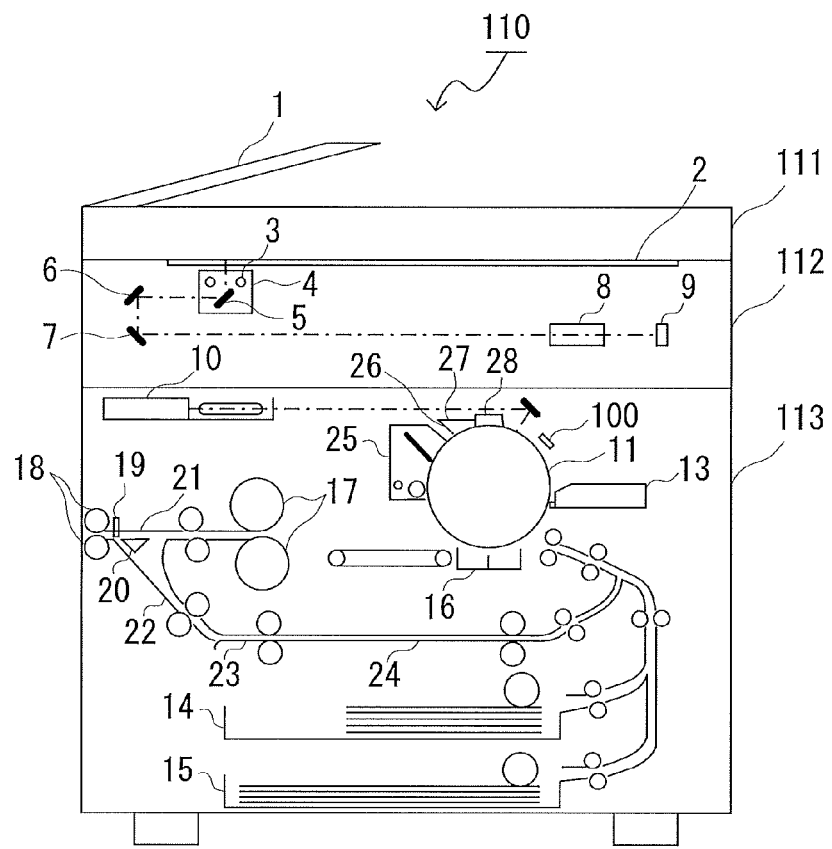
FIG. 1 is a schematic longitudinal sectional view of an image processing apparatus according to the present embodiment.

Hereinafter, an embodiment of this invention will be described with reference to the accompanying drawings. FIG. 1 is a schematic longitudinal sectional view of an image processing apparatus according to a first embodiment. The image processing apparatus 110 includes a document feeding unit 111 for feeding documents to a predetermined reading portion, image reading unit 112 for reading the fed documents, and an image forming unit 113 for forming an image based on the read data. The basic operation of the image processing apparatus 110 is described with reference to FIG. 1. The documents on a document feeder 1 of the document feeding unit 111 is fed one by one onto a document glass plane 2 of the image reading unit 112.

After feeding a document, a lamp 3 provided on a scanner unit 4 of the image reading unit 112 is lit to irradiate light on a surface of the document, and the scanner unit 4 moves in the sub-scanning direction to repeat line reading. The reflected light from the surface of the document passes through a condensing section 8 via mirrors 5 and 7, which are provided on a scanner unit 4, then, the reflected light is input to the an image sensor 9. The image sensor 9 converts the reflected light into image signals (image data). The image signals are output to an exposure control unit 10 of the image forming unit 113.

The exposure control unit 10 controls a laser drive device provided thereon to generate a laser beam according to the received image signals. The latent image formed by irradiation of the laser beam on a photoreceptor 11 is monitored by a potential sensor 100 to determine whether the potential on the photoreceptor 11 is a desired value or not. If the monitored value is a desired value, development unit 13 performs development. The photoreceptor 11 is rotated to be in synchronism with the exposure control unit 10 for every output line of the exposure control unit 10. Further, the photoreceptor 11 forms an image by repeating a line scan in a constant direction. In accordance with latent image forming timing, a transfer member is conveyed from a transfer member tray 14 or 15, and, in the transferring unit 16, the developed toner image as described above is transferred on the transfer member. The transferred toner image is fixed on the transfer member by a fixing unit 7, and the transfer member is discharged from a pair of discharge rollers 18 to the exterior of the image forming apparatus. The line direction in the line scan repeated in this manner matches with the direction of read line in the scanner 4, which is the main scanning direction. The sub-scanning direction, the direction in which the scanner moves, is perpendicular to the main scanning direction, and matches with the conveying direction of the transfer member. In the following, the conveyance direction of the transfer member is sometimes described as a first direction. As mentioned, the first direction matches with the sub-scanning direction. Further, the main scanning direction which is perpendicular to the first direction of the sub-scanning direction, is sometimes described as a second direction. The surface of the photoreceptor 11 is, after the transfer, cleaned by a cleaner 25. The cleaned surface of the photoreceptor 11 is neutralized with an auxiliary electrification unit 26, and is adjusted by primary electrification unit 28 to obtain proper electrification. Then, the remaining electric charge on the photoreceptor 11 neutralized by an exposure lamp 27, and the surface of the photoreceptor is electrified by the primary electrification unit 28. The image forming apparatus 110 repeats the above image forming processing for forming two or more images.

When forming images on both sides of the transfer member, after forming an image on the surface of the transfer member, and when the back end of the transfer member conveyed from the fixing unit 17 is detected by a sheet detection unit 19, the rotation of the pair of discharge roller 18 is stopped. A flapper 20 provided in an ejection passage 21 switches a passage for the transfer member to a reversal passage 22. Then, the rotation direction of the discharge roller pair 18 is reversed and the transfer member is conveyed to the reversal passage 22. The transfer member is conveyed via a reversal conveyance path entrance 23 from the reversal passage 22 to reversal conveyance path 24. The transfer member is again conveyed from the reversal conveyance path 24 to the transferring unit 16, and an image is formed on the back of the transfer member as described in the above mentioned image forming operation.

Figure 2:
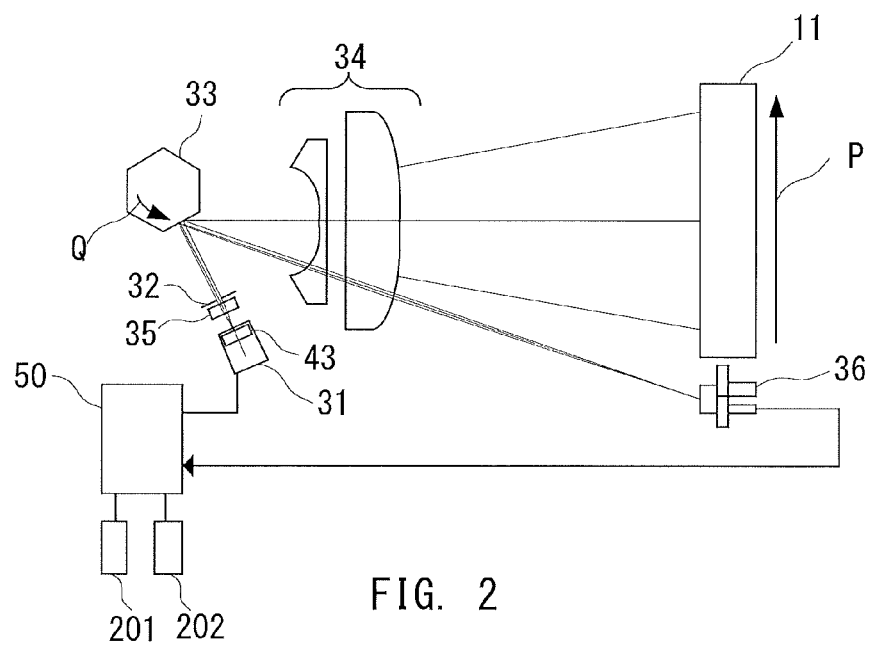
FIG. 2 is a configuration diagram illustrating the detail of an exposure control unit of the image processing apparatus.

FIG. 2 is a configuration diagram illustrating the detail of the exposure control unit 10. The exposure control unit 10 includes a semiconductor laser 43, a laser drive device 31, a diaphragm 32 and a rotating polygon mirror (hereinafter described as "polygon mirror") 33, f-θ lens 34, a collimating lens 35, and a beam detection sensor (herein after described as "BD sensor") 36. The exposure control unit 100 further comprises a CPU 50 for image processing (herein after simply described as "CPU"), a look-up table (herein after described as LUT), and a RAM 201 in which another LUT 55, described later, is stored therein. The RAM 201 also serves as a seed value storing unit 51 (described later). The exposure control unit 10 further comprises a RAM 202 for temporarily storing the image data. In particular, the RAM 202 is used as a line buffer 53 and a frame buffer 54 (described later). The exposure control unit 10 exposes the surface of the photoreceptor 11 by scanning the laser beam, which is pulse width modulated according to the image data, in the main scanning direction.

The image signal output from the image sensor 9 is input to the CPU 50. The CPU 50 performs pulse width modulation (PWM) table conversion of the input image signals according to the image forming mode of the image processing apparatus 110 and outputs the converted signals to the laser drive device 31 as laser drive signals. Further, after performing the PWM table conversion, according to the setting of scan magnification ratio (an enlargement ratio or a reduction ratio), a pixel is added or deleted. The laser drive device 31 receives the laser drive signal from the CPU 50 to drive the semiconductor laser 43.

Provided inside the semiconductor laser 43 is a PD (photo-diode) sensor for detecting a part of a laser beam. Based on the detection signal of PD sensor, auto power control for a laser diode is performed. The laser beam emitted from the semiconductor laser 43 is adjusted, by the collimating lens 35 and the diaphragm 32, to be substantially parallel light. Then, the laser beam enters into the polygon mirror 33 with a predetermined beam diameter. The polygon mirror 33 is driven by a driving device (not shown) to rotate with a constant angular velocity in the direction illustrated by an arrow Q in FIG. 2. With this rotation, the entered laser beam is reflected to be a deviation beam, and the angle of which is continuously displaced.

The deviation beam is condensed with f-θ lens 34. At this time, F-θ lens 34 corrects distortion aberration of a deviation beam in that case. Therefore, the deviation beam is scanned at a constant velocity in the direction of the arrow P on the photoreceptor 11, which serves as an image support object. BD sensor 36 detects the reflected light from polygon mirror 33. The signal is a synchronization signal (main scanning synchronization signal) for synchronizing the rotation of the polygon mirror 33 and the writing of the image data for keeping the image formation position in the main scanning direction constant.

Through the processes described above, an image is formed on the surface of the transfer member. Upon forming an image, heat is applied when fixing the transferred toner image in the fixing unit 17. The transfer member may be expanded or reduced by this heat. If the transfer member is expanded or reduced, the image size output on the transfer member differs from the image size input from the image sensor 9. The elastic rate (expansion/contraction rate) of the transfer member mainly depends on the constituent material of the transfer member. For example, if a user specifies a type of the transfer member through a control panel (not shown) in advance to perform magnification changing of the reciprocal of the elastic rate in the CPU 50, the size of the output image, intended by the user, can be obtained.

Next, the detail of the processing to perform magnification changing of the image data in the CPU 50 is described. In the present embodiment, description is given in a case where the transfer member (for example, recording paper) is reduced by 90.90909 . . . (=100/110)[%] in the main scanning direction and reduced by 90.90909 . . . (=100/110) [%] in the sub-scanning direction by fixing. The size of the input image corresponds to 100 pixels in the main scanning direction and 100 pixels in the sub-scanning direction. Further, the CPU 50 inputs and outputs the image by a unit of 1 line (every time one line is input, one line is output).

Figure 3:
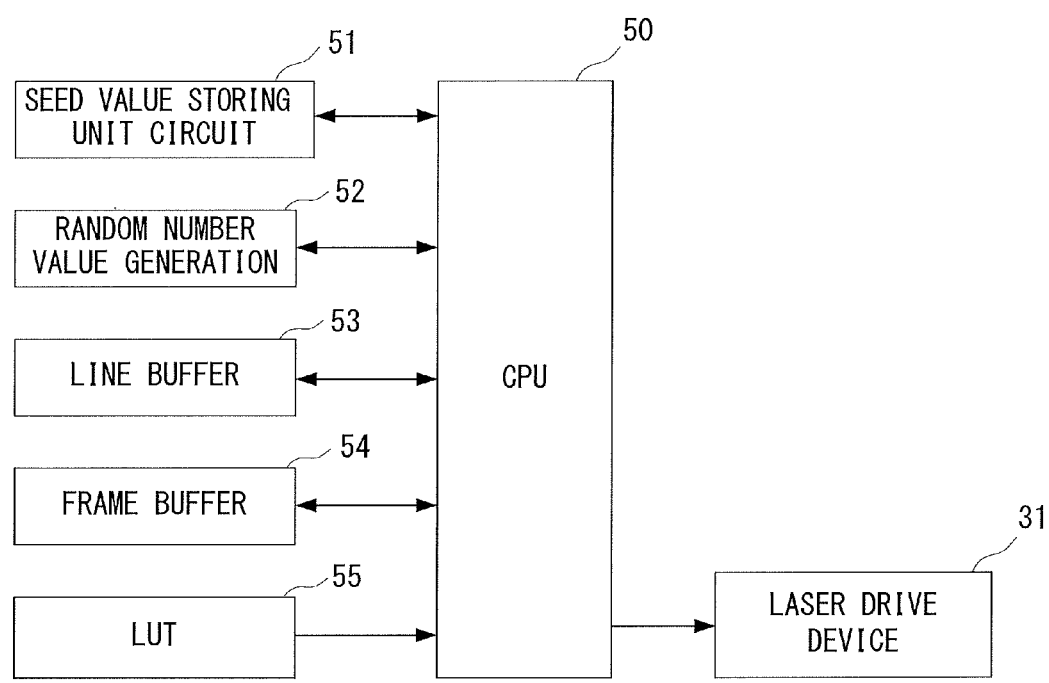
FIG. 3 is a configuration diagram of peripherals of an image processing central processing unit (CPU) connected to a laser driving device.
Figure 4:
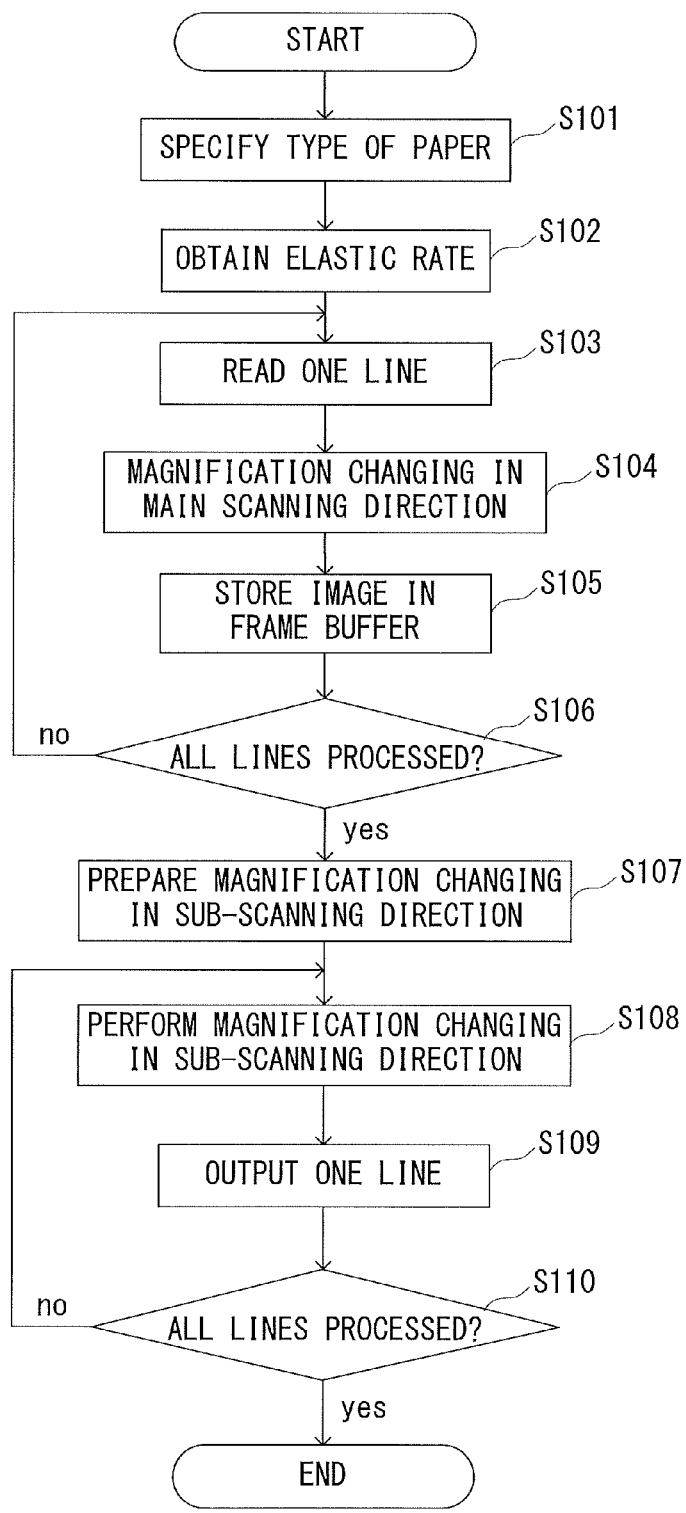
FIG. 4 is a flowchart illustrating a processing procedure of magnification changing processing.

FIG. 3 is a block diagram illustrating a configuration example of an image processing unit 50 and its peripherals. FIG. 4 is a flowchart illustrating processing procedure of the magnification changing processing by the CPU 50. Description is given with regard to the magnification changing processing of the image in the image processing apparatus 100 with reference to FIGS. 3 and 4.

The CPU 50 obtains recording medium information indicating the type of the recording medium set by the user through the control panel (not shown) (S101). Further, the elastic rate information corresponding to the obtained recording medium information is obtained from the LUT 55 (S102). The LUT 55 is data previously prepared in the image processing apparatus 110 as a library. LUT 55 includes, for example, the elastic rate information to the main scanning direction and the sub-scanning direction of the recording medium corresponding to the recording medium information. Instead of the elastic rate information of the recording medium, information on a magnification rate (an enlargement ratio or a reduction ratio) to the image may be stored in the LUT 55. In the processing of S102, the elastic rate information to the main scanning direction and the sub-scanning direction respectively are obtained. In the following, description is given with an example in which the transfer member, which is reduced by 90.90909 . . . (=100/110)[%] in the main scanning direction and reduced by 90.90909 . . . (=100/110)[%] in the sub-scanning direction is specified. Thus, the elastic rate information obtained from the LUT 55 will be the value which is reduced by 10[%] in the main scanning direction and reduced by 10[%] in the sub-scanning direction. Therefore, it is necessary to enlarge the original image data by 10[%] in the main scanning direction and enlarge 10[%] in the sub-scanning direction to form the enlarged image on the transfer member. As above, the enlarged image is formed on the transfer member, in which the original image data is enlarged by 10[%] in the main scanning direction and enlarged by 10[%] in the sub-scanning direction. Thereafter, the original image data is reduced by 90.90909 . . . [%] in the respective directions during the image formation process. As a result, the image having the size of 100(110*100/110)[%] is output. Note that, the flow of S101 may be omitted and the elastic rate may be directly specified by the user through the control panel (not shown).

Thereafter, the CPU 50 reads the image data of one line (S103). Further, the CPU 50 performs the magnification changing processing in the main scanning direction (main scanning direction magnification changing processing) to the image data of one line read. Then, the CPU 50 outputs the image data of one line after processing (S104). The detail of the main scanning magnification changing processing will be described later. The CPU 50 causes a frame buffer 54 to store the output image data of one line after processing (S105). Each processing from the S103 to S105 is repeated until the whole page on which the image is formed. Thus, the image data on the whole page is eventually stored in the frame buffer 54.

The CPU 50 determines whether the main scanning magnification changing processing is performed to the whole image on one page (S106). In particular, every time the CPU 50 reads the image data of one line, the total number of lines read is stored in, for example, the RAM 201. Then, detecting that the total number of lines stored becomes equal to the sub-scanning size of the input image data, the CPU 50 determines that the processing to the whole page is finished. If it is determined that there is the image data remain unprocessed (S106: no), the CPU 50 returns to the processing of S103 and repeats the processing.

If it is determined that there is no image data remain unprocessed (S106: yes), as preprocessing to perform the magnification changing processing in the sub-scanning direction (sub-scanning magnification changing processing), the CPU 50 initializes each parameter used in the sub-scanning magnification changing processing. Detail of the processing will be described later together with the detail of the sub-scanning magnification changing processing. Thereafter, when the main scanning synchronization signal is detected, the CPU 50 starts the sub-scanning magnification changing processing to the image data of one line having performed the main scanning magnification changing processing and outputs the image data of one line having processed. The detail of the sub-scanning magnification changing processing will be described later.

The CPU 50 outputs the image data of one line having performed the sub-scanning magnification changing processing. Thereafter, the CPU 50 determines whether the image data of all lines (whole page) is processed or not (S110). In particular, the total number of lines output in the processing of S109 is stored in for example, the RAM 201. Then, upon detecting that the total number of lines stored is equal to the sub-scanning size of the input image data having performed the magnification changing processing, the CPU 50 determines that the processing to the whole page is finished. For example, in case of the input image in which the number of the sub-scanning lines is 100 pixels and it is enlarged by 10[%], when the total line number reaches 100*110[%]=110 lines, it is determined that the processing of all lines is completed. If it is determined that the processing to all lines is not completed (S110: yes), the processing returns to the processing of S108 and repeats the processing. If the processing to all lines is completed (S110: yes), the CPU 50 completes the magnification changing processing.

Figure 5:
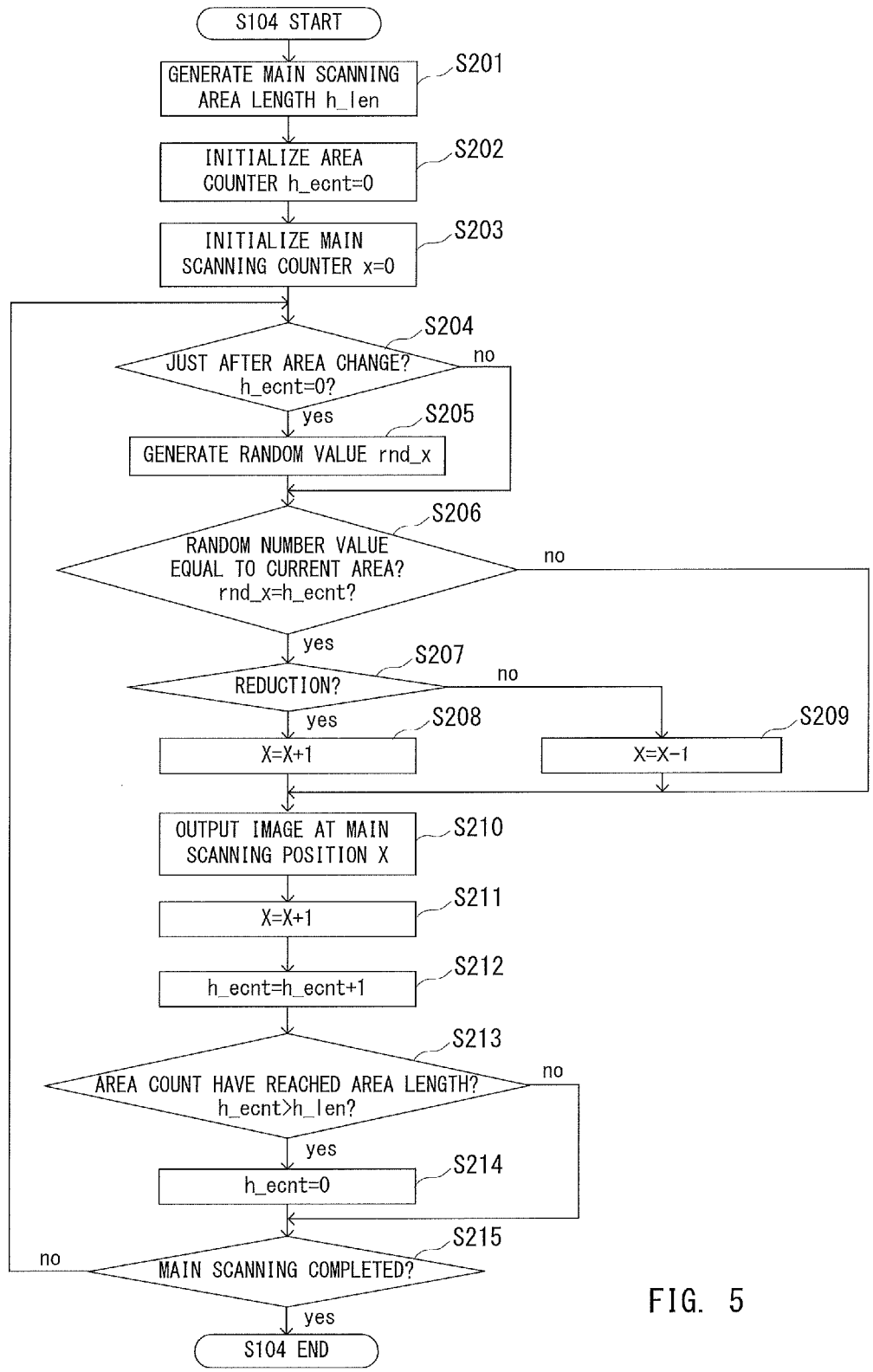
FIG. 5 is a flowchart illustrating a specific processing procedure of magnification changing processing in a main scanning direction.

Next, description is given with regard to a processing procedure of the main scanning magnification changing processing of S104 in detail. FIG. 5 is a flowchart illustrating specific processing procedures in S104 shown in FIG. 4. The CPU 50 obtains the main scanning area length h_len (S201). First, the difference between the input image size and the image size after the main scanning magnification changing is obtained. Then, by dividing the main scanning input image size by an absolute value of the difference in the number of pixels, the main scanning area length h_len is obtained. In the present embodiment, the main scanning input image size is 100 pixels and the image size is enlarged by 10[%] in the main scanning direction. As a result, the image size after the main scanning magnification processing is performed becomes 100+100*10[%]=110 pixels and the difference in the number of pixels becomes 110−100=10 in the main scanning direction. The main scanning area length h_len is obtained by dividing the input image size 100 by 10, i.e., (100/10)=10 pixels. The CPU 50 divides the image data of one line input into one or more areas (region) based on the value of the sub-scanning area length h_len. The processing is performed for every divided area.

Next, the CPU 50 initializes an area counter h_ecnt (h_ecnt=0) (S202). The area counter h_ecnt is used to count the main scanning position in the divided area. Note that the area counter h_ecnt=0 represents the timing that the area is changed. The CPU 50 also initializes a main scanning counter x (x=0) (S203). The main scanning counter x indicates a main scanning position to identify the image data to be output from the input image data of one line input in the main scanning direction. The value x of the main scanning counter 0 (zero) represents the image data positioned at the end of the image in the main scanning direction.

The CPU 50 determines whether the area to be processed is changed or not, that is, determines whether transition to the processing of a new area is performed or not (S204). In particular, when the area counter h_ecnt is h_ecnt=0, it is determined that the transition to the processing of a new area is performed. If it is determined that the area is changed (h_ecnt=0) (S204: yes), the CPU 50 gives an instruction to the random number value generation circuit 52, generates random number value rnd_x, and stores the generated random number value in the RAM 201 (S205). The random number value rnd_x generated in the processing of S205 is used in the processing performed in the same area. The range of the generated random number value rnd_x is defined by the number of pixels in the area. In this example, the range of the value that the generated random number value rnd_x takes is more than or equal to 0 (zero) and less than the main scanning area length h_len. As a method for generating the random number value rnd_x, for example, a pseudorandom number value generation circuit, in which general M-sequence primitive polynomial is employed, can be used. Note that the upper limit of the main scanning area length h_len may be adjusted according to the deterioration degree in the image quality.

If it is determined that the area is not changed (S204: yes), the CPU 50 compares the value of the random number value rnd_x corresponding to the main scanning position x to be processed with the value of the area counter h_ecnt (S206). As a result of comparison, if the values match (S206: yes), performing the magnification changing processing is required. Thus, the CPU 50 determines whether the magnification changing processing applied to the image data is to reduce the image or enlarge the image (S207). If it is determined that the magnification changing processing is to reduce the image (S207: yes), the CPU adds 1 to the value of the main scanning counter x to shift the position of the output image by one pixel behind (S208). As above, when the magnification changing processing is to reduce the image, processing to delete the image which is to be output in normal (i.e., not changing magnification) image processing and shifting the following image for reducing the size of the image is performed. On the other hand, if it is determined that the magnification changing processing is to enlarge the image (S207: no), the CPU 50 subtracts 1 from the value of the main scanning counter x for shifting the position of the output image by 1 pixel behind.

As above, when the magnification changing processing is to enlarge the image, processing to re-output the image which is one line advanced and which have been output in the previous output, instead of the image to be output in normal (i.e., not changing magnification) image processing is performed. Thereby output of the following image is delayed for enlarging the size of the image. In the processing of S206, if it is determined that the values do not match (S206: no), based on the value of the main scanning counter, the CPU 50 determines the pixel corresponding to the current main scanning position based on the image data of one line input. Then, the CPU 50 output the pixel (S210). If the value of the main scanning counter x is negative, or it is more than the size of the image data input, the CPU 50 outputs the image data value which does not cause toner to be placed on the recording medium. Note that, in the main scanning magnification changing processing, the random number value is generated for every area obtained in the processing of S201. The random number value is generated immediately after the area is changed. This random number value is used in the same area. Therefore, the random number value generated immediately after the area is changed is stored in the RAM 201.

After the image of one pixel is output in the processing of S210, the CPU 50 adds one to the value of the main scanning counter x to move to the next pixel processing (S211). To move to the next pixel processing, the CPU 50 also adds 1 to the value of the area counter h_ecnt (S212). Thereafter, the CPU 50 determines whether the next pixel to be processed is in the new area or not (S213). In particular, the CPU 50 compares the value of the area counter h_ecnt with the value of the main scanning area length h_len. As a result, if the value of the area counter h_ecnt exceeds the value of the main scanning area length h_len (S213: yes), the CPU 50 determines that a transition to the new area is performed and initializes the area counter h_ecnt (h_ecnt=0) (S214).

If the value of the area counter h_ecnt does not exceed the value of the main scanning area length h_len (S213: no), the CPU 50 determines whether the processing is performed to all image data of one line input in the main scanning direction (S215). In particular, it is determined whether the number of occurrences of "the area counter h_ecnt=0" reached the number obtained by adding "1" to the difference in the number of pixels calculated in the processing of S201 or not. Further, every time the area is changed, the area counter h_ecnt is initialized. Therefore, when the number of the occurrence of the area change reaches the number obtained by adding "1" to the difference in the number of pixels, the processing in all areas is completed. If the processing in all areas is completed (S215: yes), the processing in S104 is finished. Note that, in the processing in S215, it may be determined whether the value of the main scanning counter x reaches the image size of the main scanning direction after performing the main scanning magnification changing or not. If the processing in all areas is not completed (S215: no), the CPU 50 returns to the processing in S204 and repeats the processing.

Figure 6A:
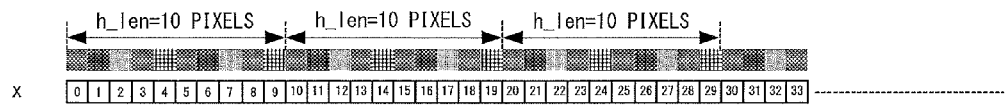
FIGS. 6A and 6B are timing charts of magnification changing processing in the main scanning direction.
Figure 6B:
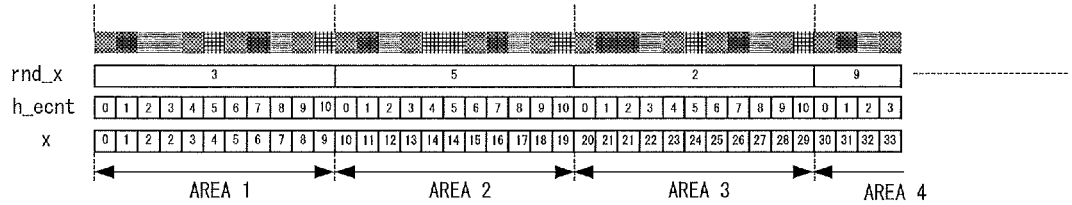

FIG. 6 is a timing chart of the main scanning magnification changing processing in the processing from S201 to S215 shown in FIG. 5. Further, FIG. 6 visually illustrates a part of an actual input and output images. FIG. 6A is the image data of one line input. In FIG. 6A, the main scanning counter x, the main scanning area length h_len, and hatched rectangulars are shown, and each hatched rectangular represents one pixel of input image. Further, in FIG. 6A, the respective relation thereof is shown. FIG. 6B is the image data of one line output after processing. In FIG. 6B, the random number rnd_x, the area counter h_ecnt, the main scanning counter x, and hatched rectangulars are shown, and each hatched rectangular represents one pixel of the output image. Further, in FIG. 6B, the respective relation thereof is shown. As shown in FIG. 6B, in an area 1, the value of the generated random number value rnd_x is "3". Thus, when the value of the area counter h_enc is "3", "1" is subtracted from the value of the main scanning counter x in the processing of S209. As a result, the pixel of the output image data at "main scanning counter x=2" is continuously output twice as the output image data. The same processing is applied in an area 2, where "area counter h_ecnt=5" and also in an area 3, where "area counter h_ecnt=2". The difference in the number of pixels obtained in the processing in S201 is 10 pixels. Thus, similar processing is performed up to an area 10. Then, the main scanning magnification changing processing is finished.

Next, details of the sub-scanning magnification changing processing shown in S107, S108, and S109 shown in FIG. 4 is explained. In the processing of S107, the CPU 50 initializes each parameter used in the sub-scanning magnification changing processing. In particular, a sub-scanning position counter y is initialized (y=0). Also, a sub-scanning area position counter v_ecnt is initialized (v_ecnt=0). Further, seed value stored in the seed value (described later) storing unit 51 is initialized. Further, the CPU 50 obtains sub-scanning area length v_len. The sub-scanning area length v_len is a value obtained by first obtaining difference between the input image size and the image size after the sub-scanning magnification changing and then, dividing the sub-scanning input image size by an absolute value of the difference in the number of pixels. In the present embodiment, the sub-scanning input image size is 100 pixels and the image size is enlarged by 10[%] in the sub-scanning direction. Thus, the image size in the sub-scanning direction after the sub-scanning magnification changing processing is 100+100*10[%]=110 [pixel]. Further, the difference in the number of pixels is 110−100=10. Thus, the sub-scanning area length v_len becomes as follows: v_len=100/10=10. The CPU 50 divides the image data of one line input into two or more areas (region) in the sub-scanning direction based on the value of the sub-scanning area length v_len. The processing is performed for every divided area.

Figure 7:
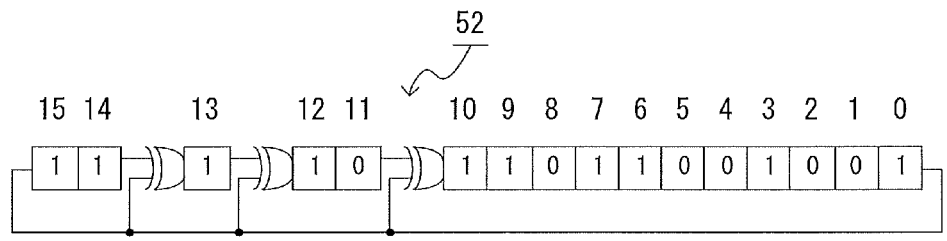
FIG. 7 is a schematic diagram of a random number value generation circuit.

Here, the details of the random number value will be specifically described. In the present embodiment, to generate the random number value, a pseudorandom number value generation circuit, in which general M-sequence primitive polynomial is used. FIG. 7 is a diagram schematically illustrating a random number value generation circuit 52 in which 16th primitive polynomial is embedded. The random number value generation circuit 52 is configured by providing 16 binary recording elements in cascade connection and providing 3 logical operation circuits, each of which intervenes between the record elements. In these figures, two or more recording elements are defined as bit 15 to bit 0 (in FIG. 7 it is indicated as "15, 14, . . . ") respectively. Further, an EXOR gate, which is an example of a logical operation circuit, intervenes between bit 14 and bit 13. Similarly, intervening EXOR gates are provided between bit 13 and bit 12, and between bit 11 and bit 10. A seed value serves as a species of a random number value. Further, the seed value is defined as a set of binary data of each bit of the random number value generation circuit 52.

In FIG. 7, the seed value of the random number value generation circuit 54 is "1111011011001001". For example, the generated random number value is determined based on the outputs of bit 2 to bit 0 of this seed value. In FIG. 7, if the values of bit 2 to bit 0 are arranged in this order, the result is "001". By converting binary to decimal, from the above result, a random number value "1" is generated. When it is necessary to generate another random number value, the binary data stored in the recording element is shifted in the predetermined direction to adjacent recording elements, thereby changing the seed value, and next random number value is generated based on the changed seed value. Specifically, the seed value for the random number value generation circuit 52 is shifted rightward. The specific procedures for generating another random number value, by shifting the seed value for the random number output circuit rightward, is as follows.

(a) Save the value of bit 0 in temporary variable temp (not shown).
(b) Assign the value of bit 1 to the value of bit 0.
(c) Assign the value of bit 2 to the value of bit 1.
(d) Assign the value of bit 3 to the value of bit 2.
(e) Assign the value of bit 4 to the value of bit 3.
(f) Assign the value of bit 5 to the value of bit 4.
(g) Assign the value of bit 6 to the value of bit 5.
(h) Assign the value of bit 7 to the value of bit 6.
(i) Assign the value of bit 8 to the value of bit 7.
(j) Assign the value of bit 9 to the value of bit 8.
(k) Assign the value of bit 10 to the value of bit 9.
(l) Assign the EXOR value of the value of the temporary variable temp and the value of bit 11 to the value of bit 10.

(m) Assign the value of bit 12 to the value of bit 11.

(n) Assign the EXOR value of the value of the temporary variable temp and the value of bit 13 to the value of bit 12.

(o) Assign the EXOR value of the value of the temporary variable temp and the value of bit 14 to the value of bit 13.

(p) Assign the value of bit 15 to the value of bit 14.

(q) Assign the value of the temporary variable temp to the value of bit 15. Thus, by performing the processes (a) to (q), next random number value generated.

Figure 8:
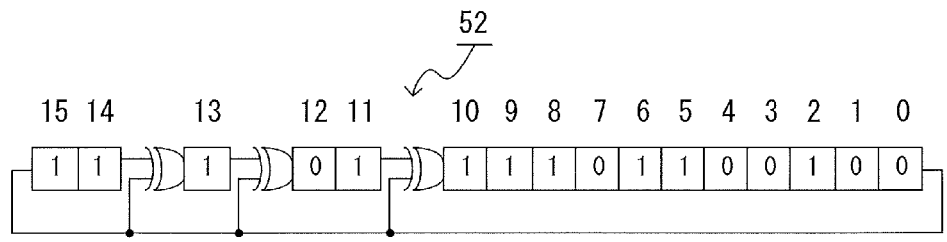
FIG. 8 is a diagram illustrating the random number value generation circuit and a seed value after one-time shift.

FIG. 8 illustrates the seed value for the random number value generation circuit 52 after the shift. The random number value is generated using the value of bit 2 to bit 0 after the shift. If the values of bit 2 to bit 0 are arranged in this order, the result is "100". By converting binary to decimal, from the above result, a random number value "4" is generated. The random number value generation circuit 52 sequentially obtains the random number value from an initial seed value by performing a logical operation. Thus, once the seed value is determined, the random number value generated thereafter is uniquely reproduced. In this embodiment, three bits are taken from the random number value generation circuit 52 to generate the random number value. Thus, the range of the random number value generated is $2^3$, in which, the random number value is any one value ranging from "0" to "7". Thus, when generating the random number value taking n number of bits, the upper limit of the random number value generated is $2^{(n-1)}$ and the range that the random number value can take is $2^n$. If the range that the random number value can take does not match the number of pixels in the area, the random number which does not correspond to the pixel in the area may be generated. In this case, generation of the random number value using a new seed value is repeated until the random number value which corresponds to the pixel in the area is generated.

For example, if the random number value of wider range is desired to obtain, what is necessary is to increase the number of bits taken from the random number value generation circuit 52. For example, instead of 3 bits, if 4 bits are taken, the range of the random number value generated is any one value ranging from "0" to "15". Further, if the upper limit of the random number value desired to generate is not "$2^{n-1}$ (n is a natural number)" and the random number value beyond the range is generated, what is necessary is to shift the seed value again and repeat the shift until the random number within the range is generated. For example, consider a case where the random number is desired to generate within the range from "0" to "3". The random number value generated at FIG. 8 is "4", which is the value outside the range. Then, the seed value is again shifted. As a result, the random number value generation circuit 52 will have the seed value shown in FIG. 9. The random number value generated by the random number value generation circuit 52 after the shift is repeated is "2", which is the value within the range from "0" to "3". Thus, the value is used as the random number value.

Figure 10:
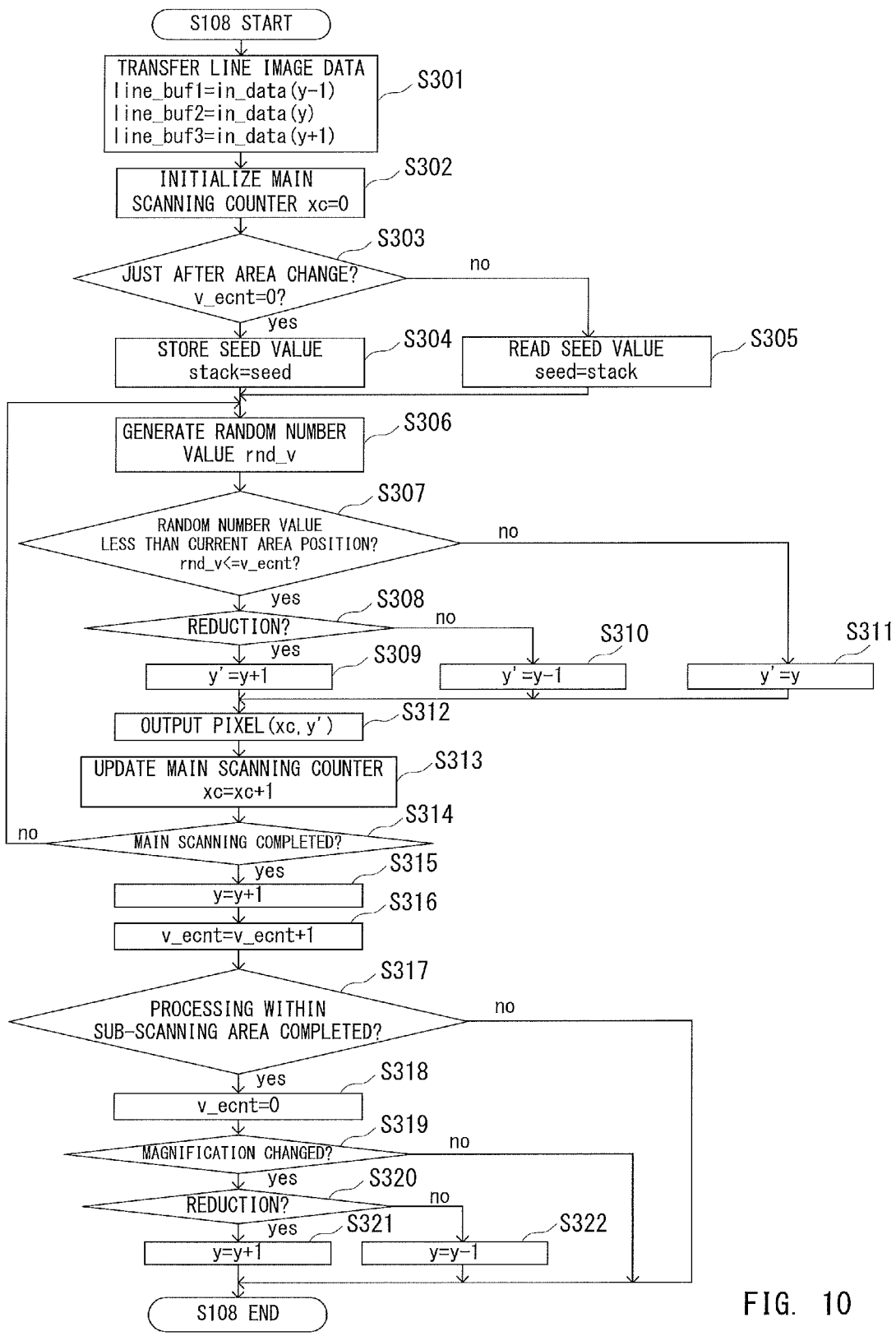
FIG. 10 is a flowchart illustrating a specific procedure of the magnification changing processing in the sub-scanning direction.

FIG. 10 is a flowchart illustrating specific processing procedure of the magnification changing processing in the sub-scanning direction in S108 shown in FIG. 4. The CPU 50 transfers the image data of one line respectively corresponding to the sub-scanning position counters y−1, y, y+1 from the frame buffer 54 to each area of line buffer 53 (line_buf1, line_buf2, line_buf3). Note that, when the sub-scanning position counters y−1, y, y+1 indicates line outside the image data, data 0 (zero) is obtained. The data 0 is the data which does not form toner image on the transfer member.

The CPU 50 initializes the main scanning position counter xc (xc=0) (S302). The main scanning position counter xc indicates a main scanning position of the image data to be output from the image data input in the main scanning direction. The CPU 50 determines whether sub-scanning area is changed and transition to the processing of the new area is performed or not (S303). If it is determined that the sub-scanning area is changed (v_ecnt=0) (S303: yes), the CPU 50 stores the seed value of the random number value generation circuit 52 at the time to the seed value storing unit 51. It means that the seed value which is immediately before the processing in the new sub-scanning area is started is stored in the seed value storing unit 51 (S304). If it is determined that the sub-scanning area is not changed (S303: no), the CPU 50 reads the seed value stored in the seed value storing unit 51 (S305). It means that while the processing in one sub-scanning area is continued, the seed value stored in the seed value storing unit 51 is read.

The CPU 50 instructs to the random number value generation circuit 52 to generate the random number value rnd_v before the processing in the area is started based on the seed value stored in the processing of S304, or the seed value read in the processing of S305 (S306). At this time, in S306, the seed value is changed before generating the random number according to the predetermined rule. As for the predetermined rule, as long as the seed value which is different from the original seed value is uniquely defined from one seed value, any rule can be adapted.

Figure 9:
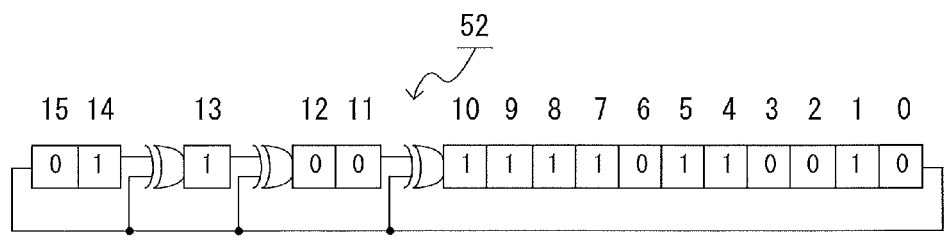
FIG. 9 is a diagram illustrating the random number value generation circuit and a seed value after two-times shift.

In this embodiment, as explained using FIGS. 7 to 9, binary data shown in FIG. 7 is used as the seed value. To change the seed value, the binary data stored in the recording element is shifted in the predetermined direction to adjacent recording elements. Then, another random number value is generated based on the changed seed value. Thereafter, in S306, based on the predetermined rule, a pseudorandom number value is generated based on the seed value changed. In the following, the detail of how to generate the pseudorandom number value is explained, in which the main scanning counter is initialized in S302, where xc=0, and the seed value stored in the seed value storing unit 51 in S304 or S305 is set to S0.

In FIG. 10, in S306, the seed value S0 stored in the seed value storing unit 51 is changed to obtain a seed value S1. A method to change the seed value is similar to that explained in FIGS. 7 to 9. In the following, description is given in a case where the seed value S1 obtained by changing the seed value S0 is the seed value "1111011011001001" shown in FIG. 7. In S306, the random number is generated using the seed value S1 obtained. As shown in the explanation in FIGS. 7 to 9, the random number value obtained from S1 is "1". Therefore, when xc=0, using the random number value "1", processing of S307 to S314, shown below is performed.

Thereafter, the CPU 50 determines whether the value of the random number value rnd_v generated is less than or equal to the value of the sub-scanning area position counter v_ecnt or not (S307). If it is determined that the value of the random number value rnd_v is less than or equal to the value of the sub-scanning area position counter v_ecnt (S307: yes), performing the magnification changing processing is required. Thus, the CPU 50 determines whether the magnification changing processing applied to the image data is to reduce the image or to enlarge the image (S308). If it is determined that the magnification changing processing is to reduce the image (S308: yes), the CPU 50 assigns the value in which 1 is added to the value of the sub-scanning position counter y as the value of an output image line y′ (S309). If it is determined that the magnification changing processing is to enlarge the image (S308: no), the CPU 50 assigns the value in which 1 is subtracted from the value of the sub-scanning position counter y as the value of the output image line y' (S310). If the value of the random number value rnd_v exceeds the value of the sub-scanning area position counter v_ecnt (S307: no), the CPU 50 assigns the value of the sub-scanning position counter y as the value of the output image line y' (S311).

Thereafter, the CPU 50 reads and outputs the pixel at a position identified by the value of the main scanning position counter xc and the value of the output image line y' from the arranged pixels from a predetermined area in the line buffer 53. The output image line y' is used to select the area in the line buffer 53. In particular, when this is performed via the processing of S309, the area in the line buffer 53, line_buf3, is referred. Further, when this is performed via the processing of S310, the area in the line buffer 53, line_buf1, is referred. Further, when this is performed via the processing of S311, the area line in the line buffer 53, line_buf2 is referred. The main scanning position counter xc is used to identify the pixel in the line buffer in the main scanning direction.

To update the main scanning position, the CPU 50 adds 1 to the value of the main scanning position counter xc (S313). Thus, when xc=0, it becomes xc=1. Then, based on the value of the main scanning position counter xc, the CPU 50 determines whether the main scanning is finished or not, that is, whether the output of all the main scanning sizes is completed or not (S314). The main scanning size is not the input image size but the image size after the magnification changing in the main scanning direction is performed. In the present embodiment, the input image in the main scanning direction is 100 pixels and the elastic rate is 10[%] enlargement, the number of pixels in the main scanning direction after performing the magnification changing is 110 pixels. Thus, when the value of the main scanning position counter xc reaches sc=110, it is determined that the output of all the main scanning sizes is completed. If it is determined that the output is not completed (S314: no), the CPU 50 returns to the processing of S306 and repeats the processing.

If the value of the main scanning position counter xc is 1, the determination result is "no" in S314. Then, the processing returns from S314 to S306. In S306, the seed value S1 is changed according to the predetermined rule. As a result, in this embodiment, the seed value S1 is changed to a seed value S2 including the value "1110111101100100" shown in FIG. 8. Further, in S306, the random number is generated based on the seed value S2 changed. As explained in FIG. 8, the random number value "4" is generated from the seed value S2.

Thereafter, as mentioned, S307 to S312 are performed. In S313, the value of the main scanning position counter xc is updated from 1 to 2. Since the value of the main scanning position counter xc is 2, the determination result in S312 is "no". Then, the processing again returns to S306. In S306, the seed value S2 is changed to generate a seed value S3. The value of the seed value S3 is the value "0110011110110010" shown in FIG. 9. Further, the random number value "2" is generated from the seed value S3. In the following, the above procedure is repeated. Then, in S306, seed values S3, S4 . . . S9 are changed according to the predetermined rule to obtain seed values S4, S5 . . . S10. Then, the random number values are respectively generated from the seed values obtained.

Further, if it is determined that the processing is completed (S314: yes), the CPU 50 adds 1 to the value of the sub-scanning position counter y to update the sub-scanning position (S315). Then, to update the sub-scanning area position, the CPU 50 adds 1 to the value of the sub-scanning area position counter v_ecnt (S316).

Thereafter, the CPU 50 determines whether the processing in the sub-scanning area is completed or not (S317). In particular, if the elastic rate corresponds to enlargement, the CPU 50 detects that the value of the sub-scanning area position counter v_ecnt becomes equal to the value in which 1 is added to the value of the sub-scanning area length v_len. Then, the CPU 50 determines that the processing is completed. Further, if the elastic rate corresponding to reduction, the CPU 50 detects that the value of the sub-scanning area position counter v_ecnt becomes equal to the value in which 1 is subtracted from the value of the sub-scanning area length v_len. Then, the CPU 50 determines that the processing is completed. If the elastic rate is 0[%], the CPU 50 detects that the value of the sub-scanning area position counter v_ecnt becomes equal to the value of the sub-scanning area length v_len. Then, the CPU 50 determines that the processing is completed. When the processing in the sub-scanning area is completed (S317: yes), the CPU 50 initializes the sub-scanning area position (v_ecnt=0) (S318). If not (S317: no), the CPU 50 finishes the processing.

If the magnification changing processing is not performed (S319: no), the CPU 50 finishes the processing. If the magnification changing processing is performed (S319: yes), the CPU 50 determines whether the magnification changing processing is performed in a reduction direction or in an enlargement direction or not (S320). If the magnification changing processing is performed in the reduction direction (S320: no), 1 is added to the value of the sub-scanning position counter y (y=y+1) (S322). Further, if the magnification processing is performed in the reduction direction (S320: yes), the CPU 50 subtracts 1 from the value of the sub-scanning position counter y (y=y−1) (S321). The above is how the CPU 50 performs the processing of S108.

Note that, in the example explained as above, during S301 to S315, the value of the sub-scanning area position counter v_ecnt is 0. In S316, the value of the sub-scanning area position counter v_ecnt becomes 1. Thereafter, when the determination result of S317 becomes "no", the processing of S108 is finished. In this case, the CPU 50 performs the processing of S109 and S110 shown in FIG. 4. Then, if the determination result of S110 is "no", the processing after S301 shown in FIG. 10 is performed again. Here, during the processing of S301 to S322 explained as above, no update of the seed value to the seed value storing unit 51 is performed. Therefore, the seed value in the seed value storing unit remains 0.

Therefore, when it is determined by the CPU that the determination result is "no" in S110 and the CPU 30 performs the processing after S301 shown in FIG. 10 again, as mentioned, "1" is added to the value of the sub-scanning area position counter v_ecnt. However, the processing relating to the seed value in S306 is the same as the processing performed in a case where the value of the sub-scanning area position counter v_ecnt is 0. As mentioned, regardless of the value of the sub-scanning area position counter v_ecnt, for xc=0, the seed value S1, including the value shown in FIG. 7 is always used to generate the random number value. Similarly, regardless of the value of the sub-scanning area position counter v_ecnt, for xc=1, 2, . . . 9, the seed values S2, S3, . . . S10 are always used to generate the random number value.

Figure 11:
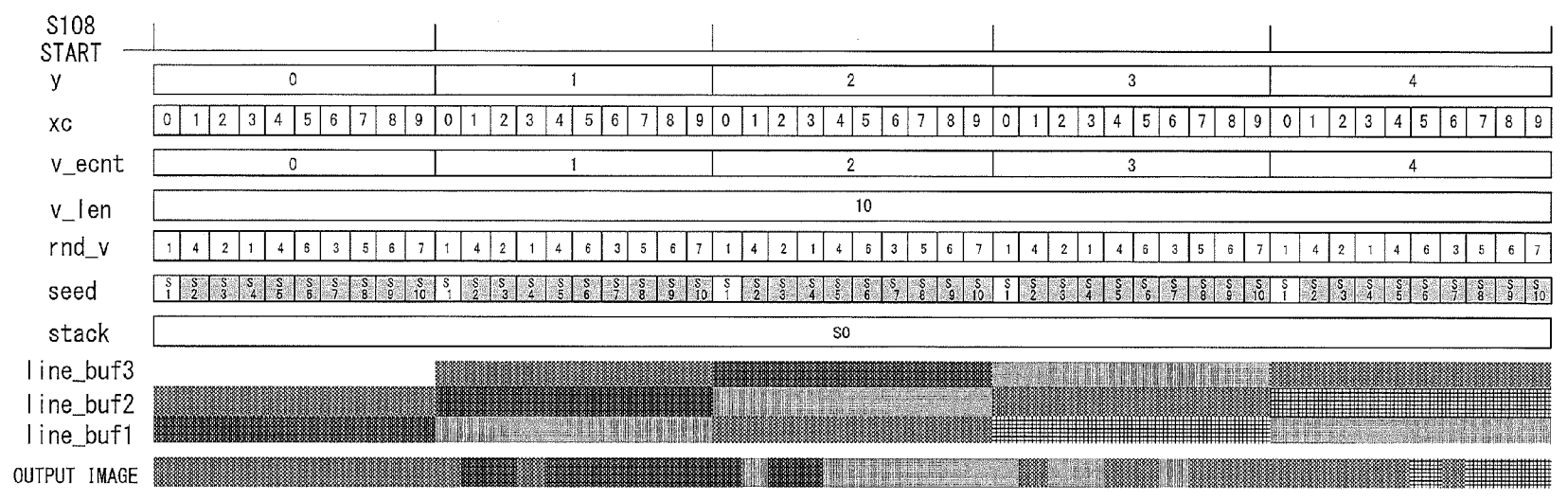
Figure 12:
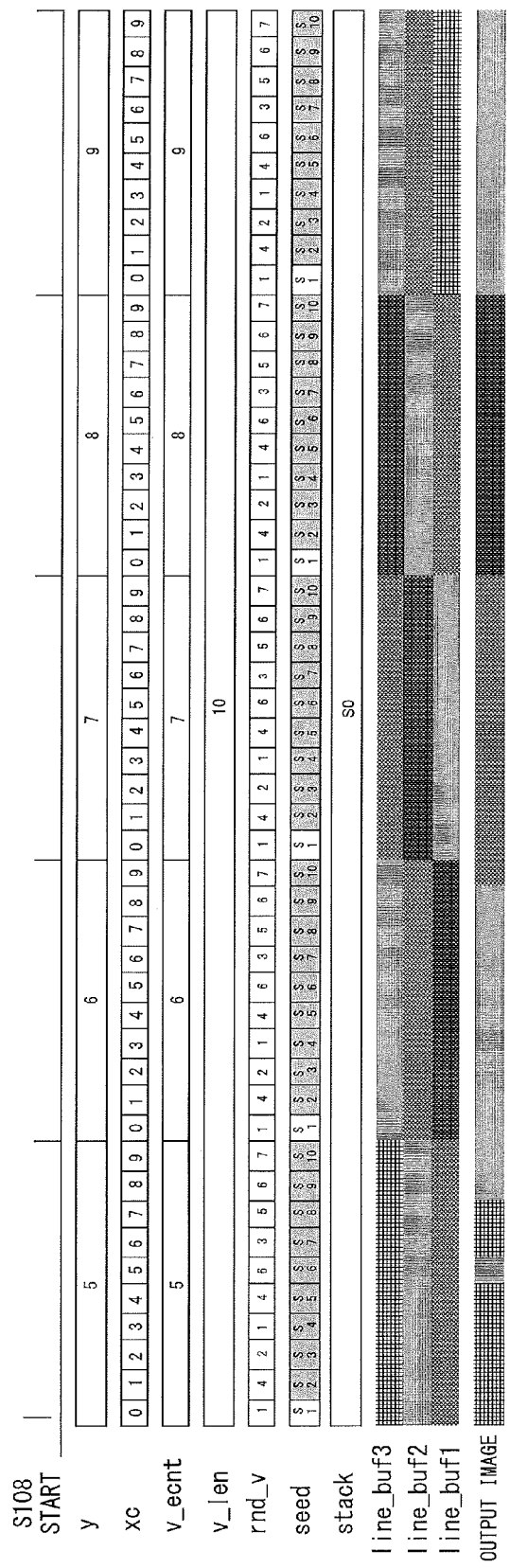
FIG. 12 is a timing chart of the magnification changing processing in the sub-scanning direction following that in FIG. 11.
Figure 13:
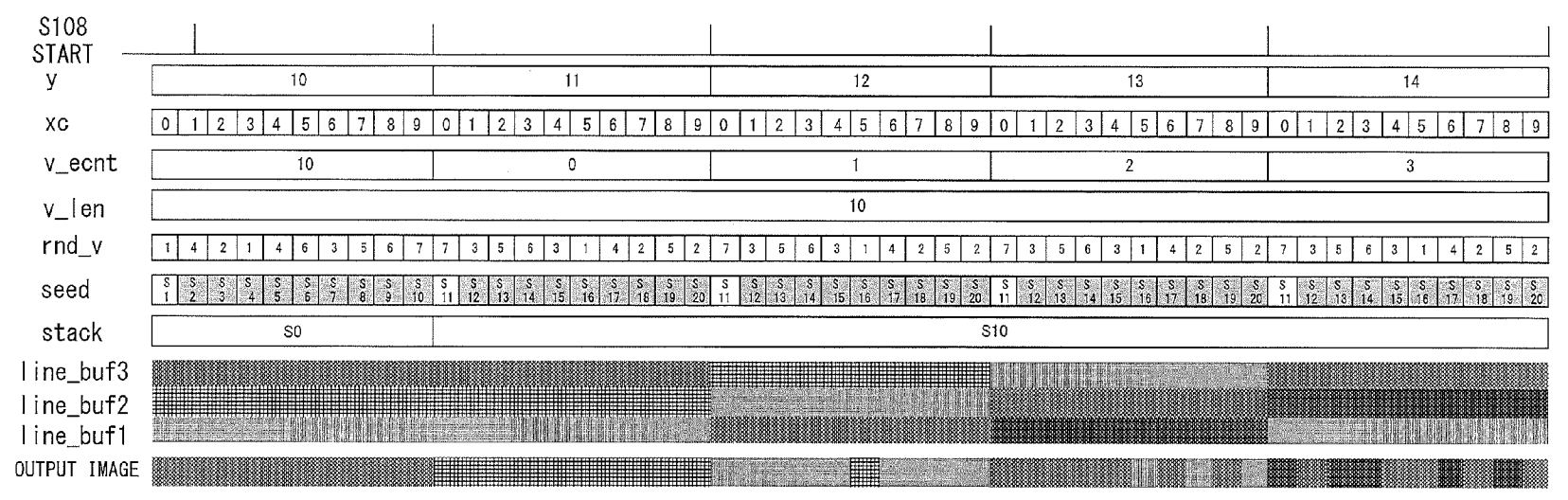
Figure 14:
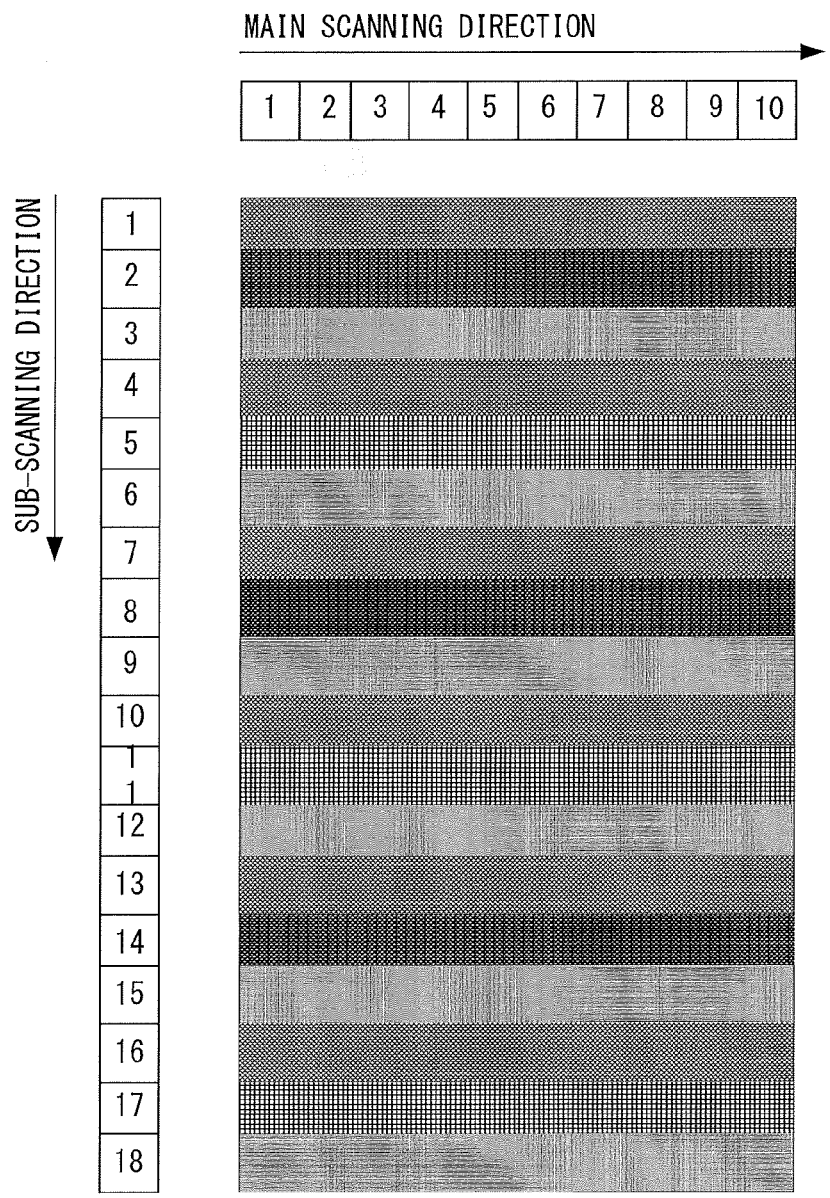
FIG. 14 is an example of an input image when the magnification processing is performed in the sub-scanning direction.

FIGS. 11, 12 and 13 are timing charts each representing the magnification changing processing performed in the sub-scanning direction of S101 to S109. FIG. 11 is the timing chart to the sub-scanning position counter y=4. FIG. 12 is the timing chart to the sub-scanning position counter y=9. FIG. 13 is the timing chart to the sub-scanning position counter y=14. Further, each of the FIGS. 11, 12 and 13 visually illustrates a part of the actual input and output images. Note that, the image data consisting of 10 pixels in the main scanning direction and 18 pixels in the sub-scanning direction as shown in FIG. 14 is stored in the frame buffer 54. Further, the elastic rate in the sub-scanning direction is 10[%] enlargement.

Figure 15:
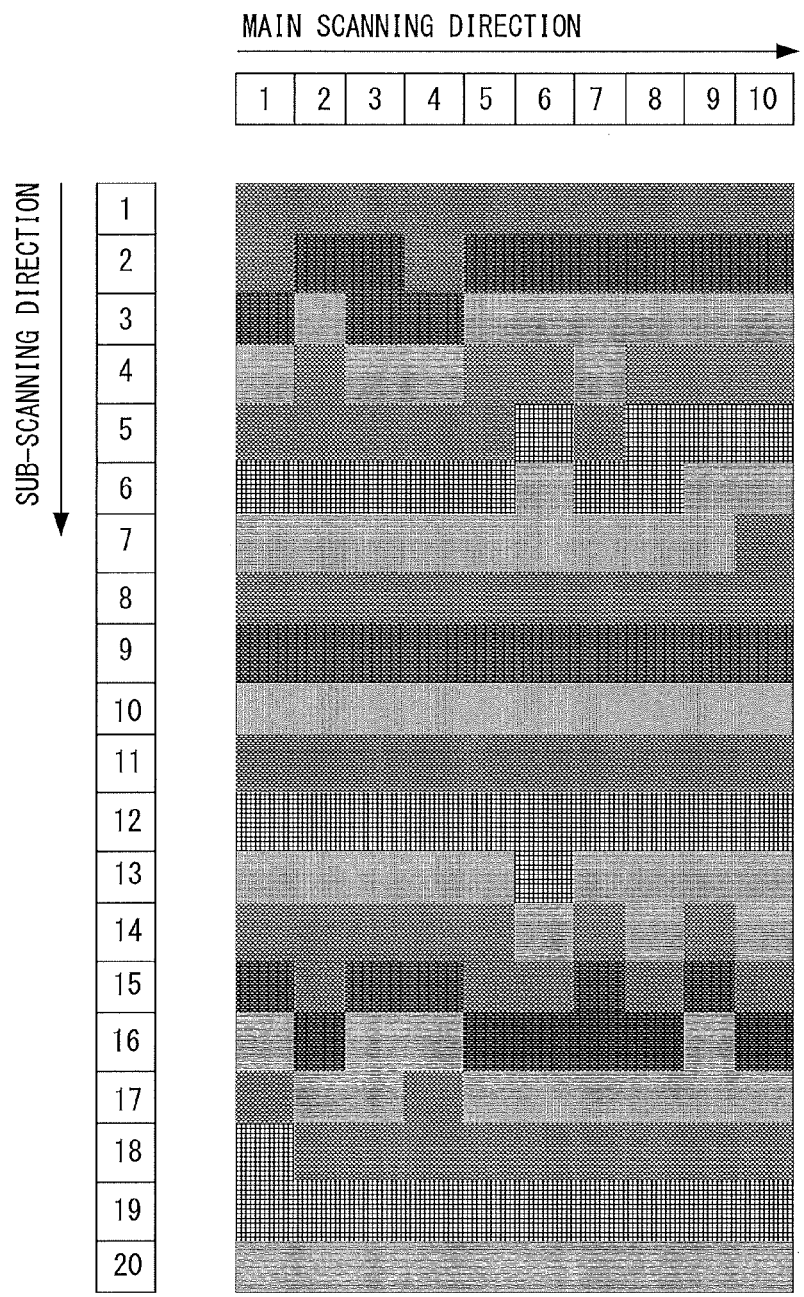
FIG. 15 is an example of an output image when the magnification processing is performed in the sub-scanning direction.
Figure 16:
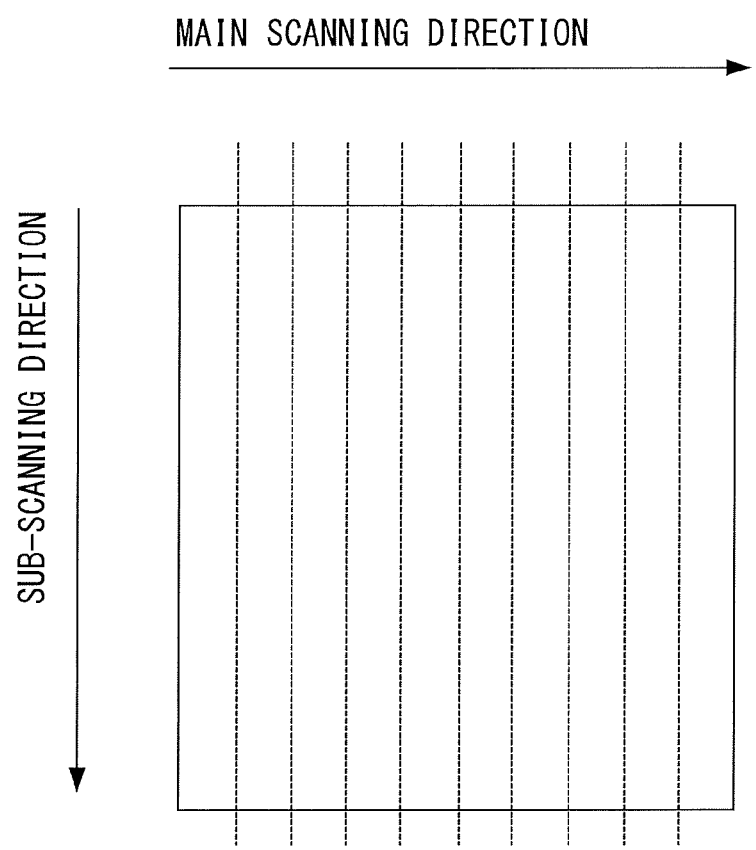
FIG. 16 is a diagram illustrating a situation where the input image is divided into areas in the main scanning direction.
Figure 17:
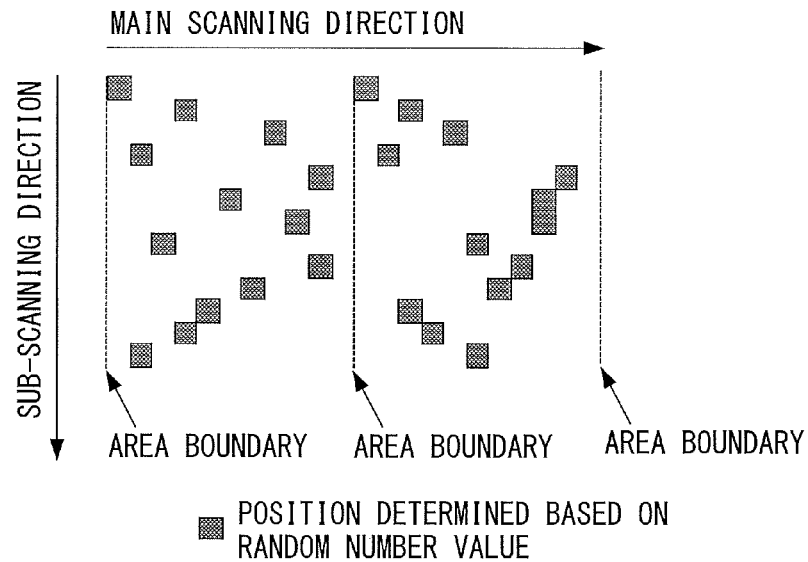
FIG. 17 is a diagram illustrating that portions to perform the magnification changing processing by the random number value are determined when magnification changing processing in the main scanning direction is performed.
Figure 18:
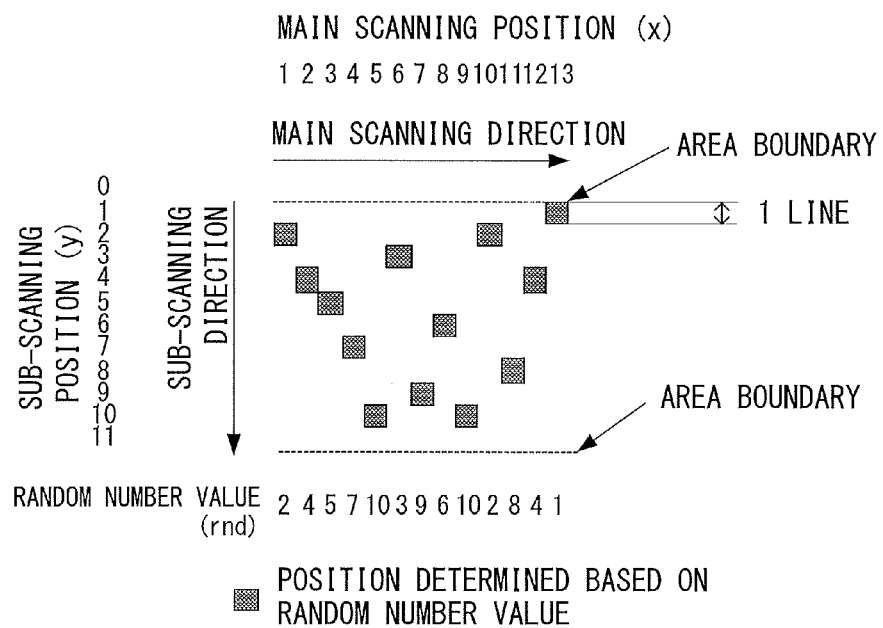
FIG. 18 is a diagram illustrating that portions to perform the magnification changing processing by the random number value are determined when magnification changing processing in the sub-scanning direction is performed.
Figure 19A:
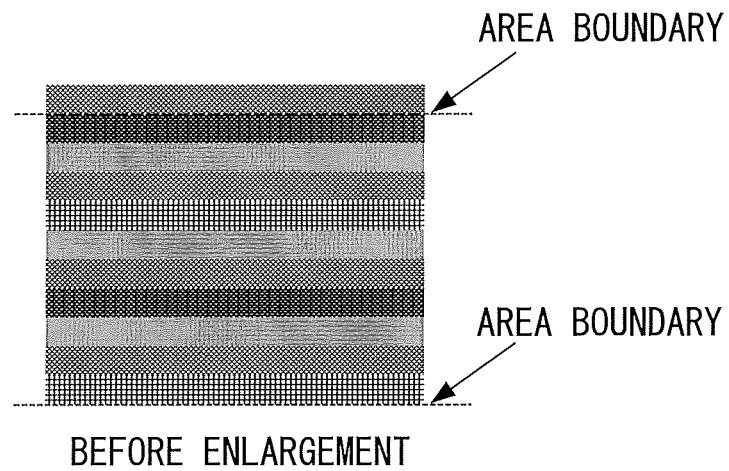
FIG. 19A is a diagram illustrating an input image for the magnification processing.
Figure 19B:
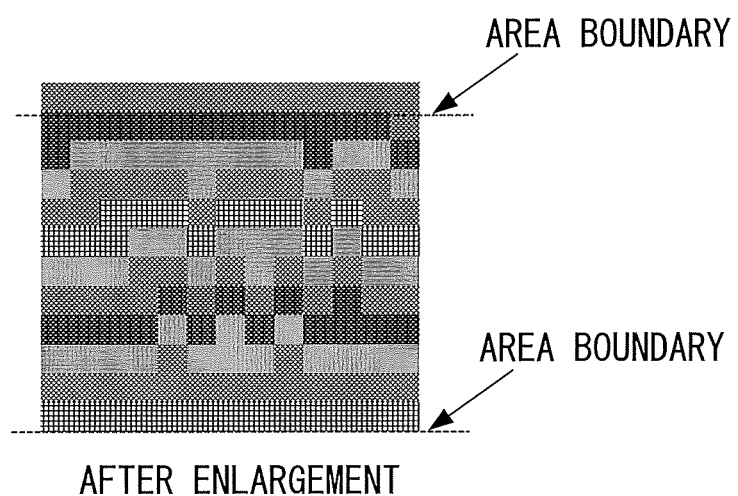
FIG. 19B is a diagram illustrating an output image after the magnification processing.

In FIGS. 11, 12, and 13, the timing charts to the sub-scanning position counter y=14 is illustrated together. As the operation of the image processing apparatus 110, the processing is continued thereafter. FIGS. 11, 12, and 13 respectively show "S108 START", which shows a timing at which main scanning synchronization signal is output. Further, S0 to S20 in "seed" respectively show the seed value. S0 and S10 in "stack" shows the seed value stored in the seed value storing unit 51. FIGS. 11, 12, and 13 respectively show "line_buf1", "line_buf2", and "line_buf3", which visually illustrates image data stored in each area in the line buffer 53. FIGS. 11, 12, and 13 respectively show "output image", which visually illustrates the image data output after the magnification changing processing is performed. The image data output after performing the magnification changing processing is connected one by one line. Then, the image after performing the magnification changing processing shown in FIG. 15 is obtained. In this manner, the enlargement processing is applied to the image data stored in the frame buffer 54.

Thus, in the image processing apparatus 110 of the present embodiment, in the image processing performed in the same area, the random number value is generated by the random number value generation circuit 52 based on the seed value stored in the seed value storing unit 51. Due to this, memory to store the random number value can be omitted. Further, as compared to a method in which the position to insert or delete one pixel at the sub-scanning position is stored for every main scanning position in the main scanning direction, the memory capacity to be mounted is reduced. Thus, the manufacturing cost of the image processing apparatus can be reduced. Further, this is a correction processing in which one pixel is always inserted or deleted at every main scanning. Therefore, it becomes possible to suppress occurrence of the main scanning position, within the predetermined range or in the whole page, in which pixels are excessively inserted or deleted. Due to this, decrease in image quality when images are enlarged or reduced can be suppressed.

As mentioned, according to the present disclosure, in the image processing performed in the same area, random number value on the basis of the same seed value is generated. This enables to omit memory to store the random number value. Further, capacity of memory to be mounted on the image processing apparatus is reduced, which enables to reduce the cost required for the image processing apparatus.

The present invention has been described in detail by way of the above-mentioned embodiments, but the scope of the present invention is not limited to those embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-077522, filed Apr. 4, 2014 which is hereby incorporated by reference wherein in its entirety.

What is claimed is:

1. An image forming apparatus comprising:
a photoreceptor on which a toner image is formed;
a transfer unit configured to transfer the toner image on a recording medium;
a fixing unit configured to fix the toner image on the recording medium;
a processor and a memory;
a storage unit configured to store image data representing the image;
a first generation unit configured to generate a first position information which represents a position of a target pixel in a first direction which corresponds to a conveyance direction of the recording medium;
a second generation unit configured to generate a second position information which represents a position of the target pixel in a second direction which is perpendicular to the first direction;
a setting unit configured to set, based on magnification changing information in the first direction which corresponds to a conveyance direction of the recording medium, a division condition for dividing the image data representing the image into two or more areas in the first direction, the setting unit including:
a pseudorandom number value generation circuit configured to generate a random number value based on a seed value;
a holding unit configured to hold a seed value; and
a seed value setting unit, and
a control unit configured to:
store a seed value which is set in the pseudorandom number value generation circuit in the holding unit when the first position information of the target pixel is different from the first position information of the previous pixel and the area of the target pixel is different from that of the previous pixel; and
set the seed value held in the holding unit in the pseudorandom number value generation circuit when the first position information of the target pixel is different from the first position information of the previous pixel and the area of the target pixel identical to that of the previous pixel,
wherein the control unit is further configured to:
cause the pseudorandom number value generation circuit for each target pixel to generate a random number value; and
perform a magnification change to the image by reading the image data corresponding to the target pixel from the storing unit based on the generated random number value, the second position information and the first position information,
wherein the processor and the memory operate to function as the first generation unit, the second generation unit, the setting unit, the holding unit, the seed value setting unit and the control unit.

2. The image forming apparatus according to claim 1, wherein:
the pseudorandom number value generation circuit is configured by providing two or more binary recording elements in cascade connection and providing a logical operation circuit which intervenes between the record elements; and
the seed value is a set of binary data held in the two or more binary recording elements, the random number value generation circuit is further configured to:
　shift, after generating a random number value based on the seed value, each of the binary data held in the two or more recording elements in a predetermined direction to adjacent recording elements, thereby changing the seed value; and
　generate next random number value based on the changed seed value.

3. The image forming apparatus according to claim 1, wherein:
　the control unit is further configured to:
　　correct the first position information based on the generated random number value; and
　　read the image data corresponding to the corrected first position information and the second position information from the storing unit.

4. The image forming apparatus according to claim 1, wherein:
　the control unit is further configured to read the image data corresponding to the generated random number value twice when performing an enlarging process; and
　the control unit is further configured not to read the image data corresponding to the generated random number when performing a reduction process.

5. The image forming apparatus according to claim 1, wherein the control unit is further configured to:
　cause the holding unit to hold a different seed value upon every occurrence of switching of the area to which the image processing is performed; and
　cause the random number value generation unit to generate a random number value based on the seed value before starting of the image processing in the switched area.

6. The image forming apparatus according to claim 1, wherein the image data is a set of pixels arranged in the main scanning direction and in the sub-scanning direction of the image, and wherein the processor and memory further operate to function as:
　a division unit configured to divide the image data into two or more areas,
　wherein the division unit is further configured to perform image processing in which, for each divided area, a pixel is inserted at a position defined by the random number value according to the input enlargement ratio, or a pixel is deleted at a position defined by the random number value according to the input reduction ratio.

7. The image forming apparatus according to claim 6, wherein a pixel in the area is specified by a random number value generated by a random number value generation unit, and
　wherein the processor and the memory operate to function as the random number value generation unit.

8. The image forming apparatus according to claim 6, wherein the random number value generation unit is further configured to generate a random number value based on another seed value when the random number value generated by the random number value generation unit does not correspond to any pixel in the area.

9. The image forming apparatus according to claim 6, wherein, in the image processing, the position of the pixel in the sub-scanning direction corresponding to the main scanning position representing a position of a pixel in the main scanning direction is defined based on the random number value generated based on the seed value.

* * * * *